(12) United States Patent
Woollen et al.

(10) Patent No.: US 7,797,697 B2
(45) Date of Patent: *Sep. 14, 2010

(54) SYSTEM AND METHOD FOR DEPLOYING APPLICATIONS WITH LIBRARY MODULES

(75) Inventors: Rob Woollen, San Francisco, CA (US); Ruslan Bilorusets, Oakland, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 675 days.

This patent is subject to a terminal disclaimer.

(21) Appl. No.: 10/969,089

(22) Filed: Oct. 20, 2004

(65) Prior Publication Data

US 2005/0251810 A1    Nov. 10, 2005

Related U.S. Application Data

(60) Provisional application No. 60/568,211, filed on May 5, 2004.

(51) Int. Cl.
G06F 9/44  (2006.01)

(52) U.S. Cl. .................. 717/170; 717/175; 717/177

(58) Field of Classification Search ................ 719/331; 717/170, 175, 177
See application file for complete search history.

(56) References Cited

U.S. PATENT DOCUMENTS

| 5,835,777 | A | 11/1998 | Staelin |
| 5,911,071 | A | 6/1999 | Jordan ........................ 717/108 |
| 6,128,647 | A | 10/2000 | Haury |
| 6,529,992 | B1 | 3/2003 | Thomas et al. |
| 6,721,777 | B1 | 4/2004 | Sharma |
| 6,751,797 | B1 | 6/2004 | Desgranges et al. ......... 719/315 |
| 6,766,324 | B2 | 7/2004 | Carlson et al. ................ 707/10 |
| 6,829,575 | B2 | 12/2004 | Freund et al. ................ 707/10 |
| 6,892,382 | B1 * | 5/2005 | Hapner et al. ............... 717/174 |
| 6,970,924 | B1 | 11/2005 | Chu et al. |
| 6,976,061 | B1 | 12/2005 | Sharma |
| 7,069,553 | B2 * | 6/2006 | Narayanaswamy et al. . 717/173 |
| 7,086,065 | B1 | 8/2006 | Yeluripati et al. ........... 719/311 |
| 7,107,592 | B2 | 9/2006 | Taylor et al. ................ 718/104 |
| 7,127,713 | B2 | 10/2006 | Davis et al. |
| 7,185,071 | B2 | 2/2007 | Berg et al. |
| 7,228,541 | B2 | 6/2007 | Gupton et al. |
| 7,302,609 | B2 | 11/2007 | Matena et al. |
| 2002/0049744 | A1 | 4/2002 | Nakos et al. |
| 2002/0078132 | A1 | 6/2002 | Cullen et al. |
| 2003/0093717 | A1 | 5/2003 | Mason |

(Continued)

OTHER PUBLICATIONS

"Microsoft Computer Dictionary," Fifth Edition, Microsoft Press, 2002; p. 115, 176, 542.*

(Continued)

Primary Examiner—Li B Zhen
(74) Attorney, Agent, or Firm—Fliesler Meyer LLP (57) ABSTRACT

Federated applications are configured to use both modules created for the applications as well as library modules which perform commonly used functions. The library modules are stored separately for deployment when utilized by applications. A deployment descriptor is configured with descriptions of internal modules and references to library modules. A deployment tool reads the deployment descriptor, extracts the library modules according to the information stored in the deployment descriptor, and loads the modules specific to the application.

15 Claims, 4 Drawing Sheets

U.S. PATENT DOCUMENTS

| | | |
|---|---|---|
| 2003/0101435 A1 | 5/2003 | Takahashi |
| 2003/0158919 A1 | 8/2003 | Fomenko |
| 2003/0204784 A1 | 10/2003 | Jorapur |
| 2003/0212990 A1* | 11/2003 | Brodkorb et al. ............ 717/174 |
| 2004/0068537 A1 | 4/2004 | Freund et al. |
| 2004/0068553 A1* | 4/2004 | Davis et al. ................ 709/218 |
| 2004/0068731 A1 | 4/2004 | Davis |
| 2004/0088681 A1 | 5/2004 | Berg et al. |
| 2004/0172407 A1 | 9/2004 | Arpirez Vega |
| 2004/0177352 A1* | 9/2004 | Narayanaswamy et al. . 717/169 |
| 2004/0255294 A1 | 12/2004 | Spotwood |
| 2005/0005200 A1 | 1/2005 | Matena et al. |
| 2005/0033767 A1* | 2/2005 | Kamentz et al. ......... 707/104.1 |
| 2005/0137856 A1* | 6/2005 | Cencini et al. ................ 704/10 |
| 2005/0138076 A1 | 6/2005 | Seo et al. |

OTHER PUBLICATIONS

Chappell, et al., "Java Message Service", O'Reilly, Dec. 2000, © 2006, Safari Books Online, 27 pages; http://proquest.safaribooksonline.com/059600685.

Taylor, A., J2EE and Beyond: Design, Develop, and Deploy World-Class Java™ Software, Prentice-Hall, Dec. 23, 2002, 40 pages.

Guo, et al., "Developing a Distributed Scalable Java Component Server", Future Generation Computer Systems, May 24, 2001, vol. 17, Issue 8, pp. 1051-1057, © 2001 Elsevier Science B.V.

Vecellio, et al., "Container Services for High Confidence Software", Jun. 10-14, 2002, Seventh International Workshop on Component-Oriented Programming, 13 pages.

Mencl, "Enhancing EJB Component Model", Academy of Sciences of the Czech Republic, 2001, 11 pages.

Popovici, "Spontaneous Container Services", ECOOP 2003, LNCS 2743, pp. 29-54.

International Search Report for PCT/US05/14430, 8 pages, Mailed Jul. 27, 2005, PCT.

* cited by examiner

SYSTEM AND METHOD FOR DEPLOYING APPLICATIONS WITH LIBRARY MODULES

PRIORITY CLAIM

The present application is a nonprovisional of U.S. Patent Application No. 60/568,211, filed on May 5, 2004, entitled FEDERATED APPLICATIONS, Inventors Rob Woolen, et al., the contents of which are incorporated by reference in their entirety.

RELATED APPLICATIONS

The present application is related to U.S. Patent Application No. 60/571,106, filed May 15, 2004, entitled SYSTEM AND METHOD FOR WEB APPLICATION EXTENSIBILITY, Inventors Mark Griffith et al., the contents of which are incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to systems, methods, and computer readable media for structuring and deploying applications.

BACKGROUND OF THE INVENTION

Since its inception in 1995, the Java™ programming language has become increasingly popular. (Java is a trademark of Sun Microsystems, Inc.) Java, which is an interpreted language, enabled the creation of applications which could be run on a wide variety of platforms. This ability to function across a variety of different client platforms and Java's relatively easy implementation of network applications has resulted in its use in endeavors as basic as personal web pages to endeavors as complex as large business-to-business enterprise systems.

As Java has become more commonplace, a wide variety of tools and development platforms have been created to assist developers in the creation and implementation of Java applications. These development platforms have usually been built around an application server program that provides a common interface for accessing internal data and resources. These development platforms have also included commonly-used modules and components that can be included in newly-created applications, thus sparing the developers the burden of creating these components and having to recreate the efforts of others. One such application platform is WebLogic Platform, by BEA systems of San Jose Calif.

While these platforms enable users to utilize previously developed modules and components, there are some inefficiencies with the current mechanisms by which these modules are included in new applications. Current configurations require that the modules be copied into every application which utilizes the modules or add the modules to a system classpath storing modules that are available to all applications. Thus, if these commonly-used modules are modified, they must be separately modified in every application which utilizes them, greatly complicating the process of maintaining web servers and complicating deployment.

Figure 1:
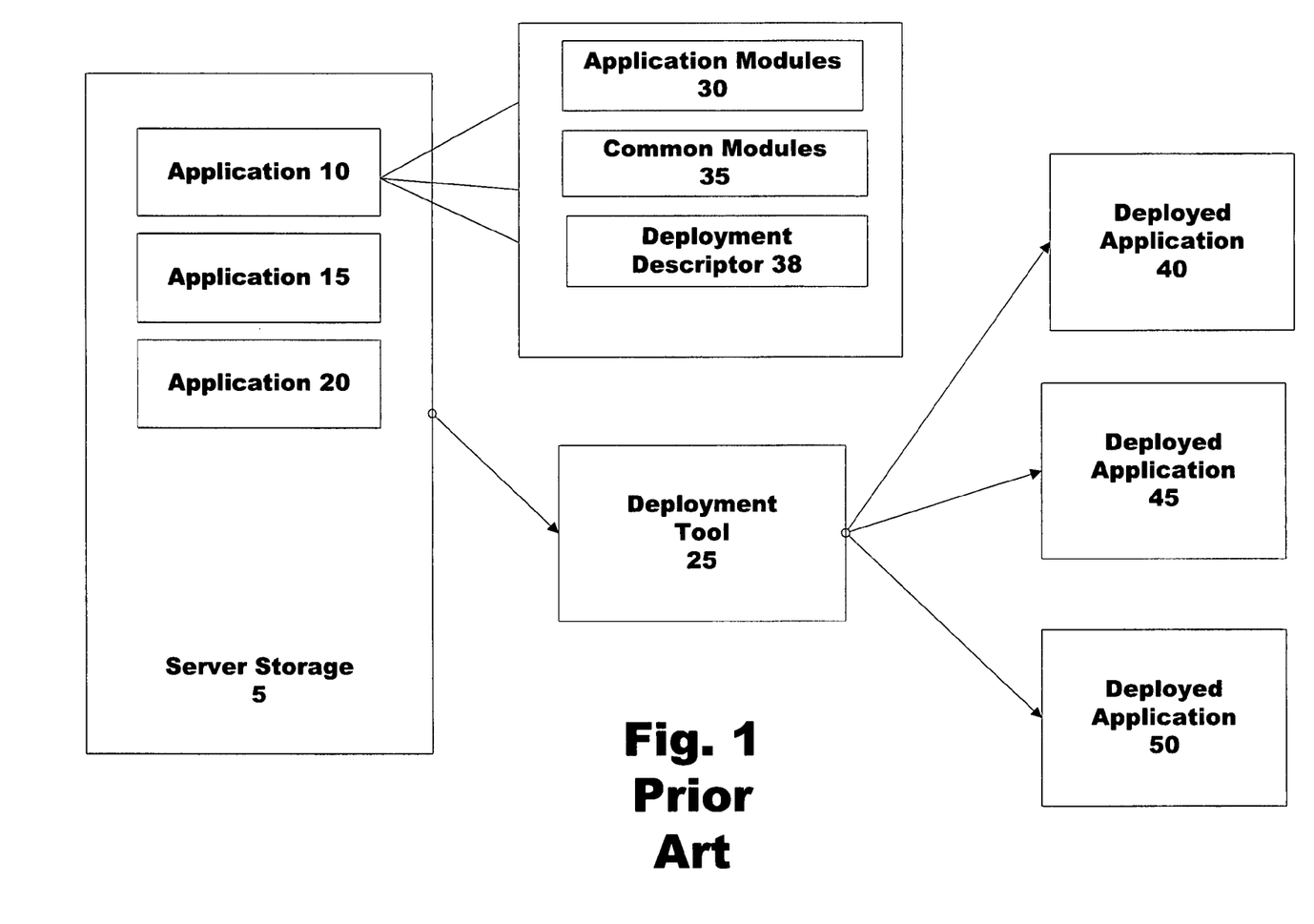
FIG. 1 illustrates an embodiment of an application deployment environment as practiced in the prior art.

FIG. 1 illustrates an embodiment of an application deployment environment as practiced in the prior art. A server storage 5 stores multiple applications 10, 15, 20 previous to deployment. The applications are preferably stored as archives for deployment by a deployment tool 25. In one embodiment, the archive is stored in the form of an Enterprise ARchive (EAR) file. Each application includes a set of application modules 30. The application modules 30 are application-specific modules that were generated by a creator of the application 40 for use in the specific application. The application 10 also includes a set of common modules 35. The common modules 35 are modules that have been created by a third party for use in other applications. The common modules 35 can include libraries, administrative web applications, Enterprise Java Beans (EJB's) and any other modules that might be made available for use in multiple applications. Applications 15 and 20 also include common modules. In the present prior art embodiment, any applications that utilize a common module must include a copy of the common module, thus requiring many multiple copies of the common module in the storage.

The application 10 also includes a deployment descriptor 38 which stores information necessary for the deployment tool 25 to successfully deploy the application. In one embodiment, the deployment descriptor is an application.xml file. As used herein, files ending with an "xml" filename extension are files in the eXtensible Markup Language (XML) format. The deployment descriptor preferably includes elements indicating each module used in the application, its type, and its path in the EAR file storing the application. If a common module 35 is used in each of the applications 10, 15, 20 it will appear in each of the EAR files, with its existence and location in the EAR referenced in the deployment descriptor 38 for the applications. The deployment descriptor 38 typically lists the location of the file in the EAR relative to a root of the EAR.

The deployment tool 25 is responsible for deploying the applications 10, 15, 20 from the server storage to generate the deployed applications 40, 45, 50. In one embodiment, the deployment tool runs when the server is started and automatically deploys a group of preselected applications. In an alternate embodiment, the deployment tool allows a system administrator to manually select which applications are deployed. The deployment tool checks the deployment descriptors 38 of each of the applications 10, 15, 20 to locate the modules 30, 35 used by the application within that application's EAR file and to deploy the application. The deployed applications are then available for use by remote clients or any party interacting with the web server.

The implementation discussed in FIG. 1 is inefficient as any modifications made to the common modules must be made in every application. Additionally, as new versions of the common modules are released it becomes difficult to track which versions are in use in each application. What is needed is a more efficient system of implementing commonly used modules.

DETAILED DESCRIPTION

In accordance with one embodiment of the present invention federated applications are configured to use both modules created for the applications as well as library modules which perform commonly used functions. The library modules are stored separately for deployment when utilized by applications. A deployment descriptor is configured with descriptions of internal modules and references to library modules. A deployment tool reads the deployment descriptor, extracts the library modules according to the information stored in the deployment descriptor, and loads the modules specific to the application.

Figure 2:
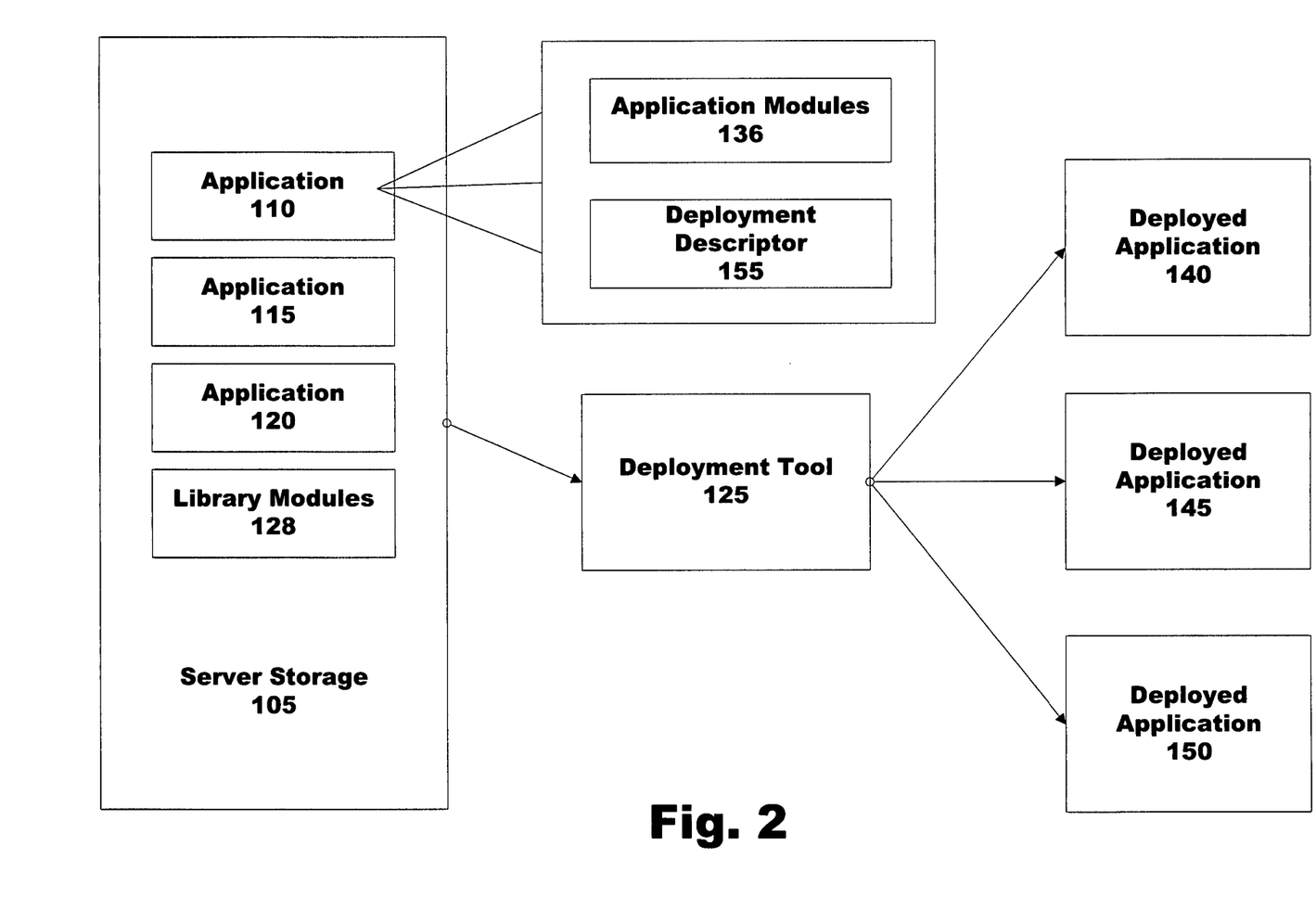
FIG. 2 illustrates an application environment in accordance with one embodiment of the present invention.

FIG. 2 illustrates an application environment in accordance with one embodiment of the present invention. The server storage 105 stores applications 110, 115, 120. These applications are stored in archives such as EAR files.

The server storage 105 also includes library modules 128. The library modules are commonly-used modules that are stored for deployment with created applications. The library modules are preferably stored in Java ARchive (JAR) files. In one embodiment, each JAR file stores a single library module. In an alternate embodiment, multiple library modules are stored in a single JAR file. The library modules typically include a manifest identifying the library module, class files, a deployment descriptor, and additional resources. The structure of the library modules is described in greater detail with respect to FIG. 3.

The library modules are typically registered with the server by including a reference to the library in the server's configuration parameters. In one embodiment, the configuration parameters include a config.XML file. When starting, the server detects the reference to the library and generates a configuration bean associated with the library. The reference to the library preferably includes a unique name for the library, a type for the library, a version of the library, and a location of the JAR file storing the library. One embodiment of a config.XML entry for a library file is disclosed below:

```
<LibraryModule
    LibraryName="BA1"
    LibraryType="rar"
    ImplementationVersion="8.1"
    ImplementationURL="file:///usr/local/ba1.rar"
/>
```

The applications 110, 115, 120 include application modules 130 which are modules that have been created for the particular application and are either not commonly utilized or not commonly utilized enough to justify their inclusion with the library modules 125. The applications also include deployment descriptors 155. In one embodiment, the deployment descriptor is an application.xml file. The deployment descriptor preferably includes information necessary for representing the application in different GUI tools, elements indicating each module used in the application, its type, and its path in the EAR file storing the application. Additionally, the application deployment descriptor includes references to the library modules 128 utilized by the application. The reference to the library module includes the library name, which uniquely identifies the library and is compared to the library name included in either the library's manifest or the config.XML file. It also includes the implementation version, which is the minimum implementation version needed by the application. The deployment tool 125 will compare this value with the implementation version stored in the config.XML file to verify that the two match. Finally, the entry includes a module-url which indicates a location on the server 105 where the library module can be located. Below is one example of an application.xml file which references library modules

```
<application>
    <display-name>ExampleApplication</display-name>
    <description>Example</description>
    <library-module>
        <library-name>WorkFlowEJB</library-name>
        <implementation-version>8.1</implementation-version>
        <module-url>workflow.jar</module-url>
    </library-module>
    <module>
        <ejb>ejb1.jar</ejb>
    </module>
    <module>
        <ejb>ejb2.jar</ejb>
    </module>
    <module>
        <web>
            <web-uri>web.war</web-uri>
            <context-root>web</context-root>
        </web>
    </module>
</application>
```

The deployment tool 125 is responsible for deploying the applications 110, 115, 120 from the server storage to generate the deployed applications 140, 145, 150. In one embodiment, the deployment tool runs when the server is started and automatically deploys a group of preselected applications. In an alternate embodiment, the deployment tool allows a system administrator to manually select which applications are deployed.

The deployment tool, when deploying an application 110, checks the deployment descriptor 155. The deployment tool first checks the library module reference to determine whether there are any library modules referenced by the application 110. If so, the deployment tool uses the identifier for the library module to locate the library module on the server storage 105. The deployment tool 125 then extracts any referenced library modules from the JAR files in which the library file is archived in the order in which the library modules are listed in the deployment descriptor. Alternately the deployment tool 125 can directly deploy the library module from the location where it is stored. If the JAR file contains multiple library modules, all of the library modules in the JAR file are deployed. The deployment tool 125 then deploys any application modules 136 within the application 110.

Figure 3:
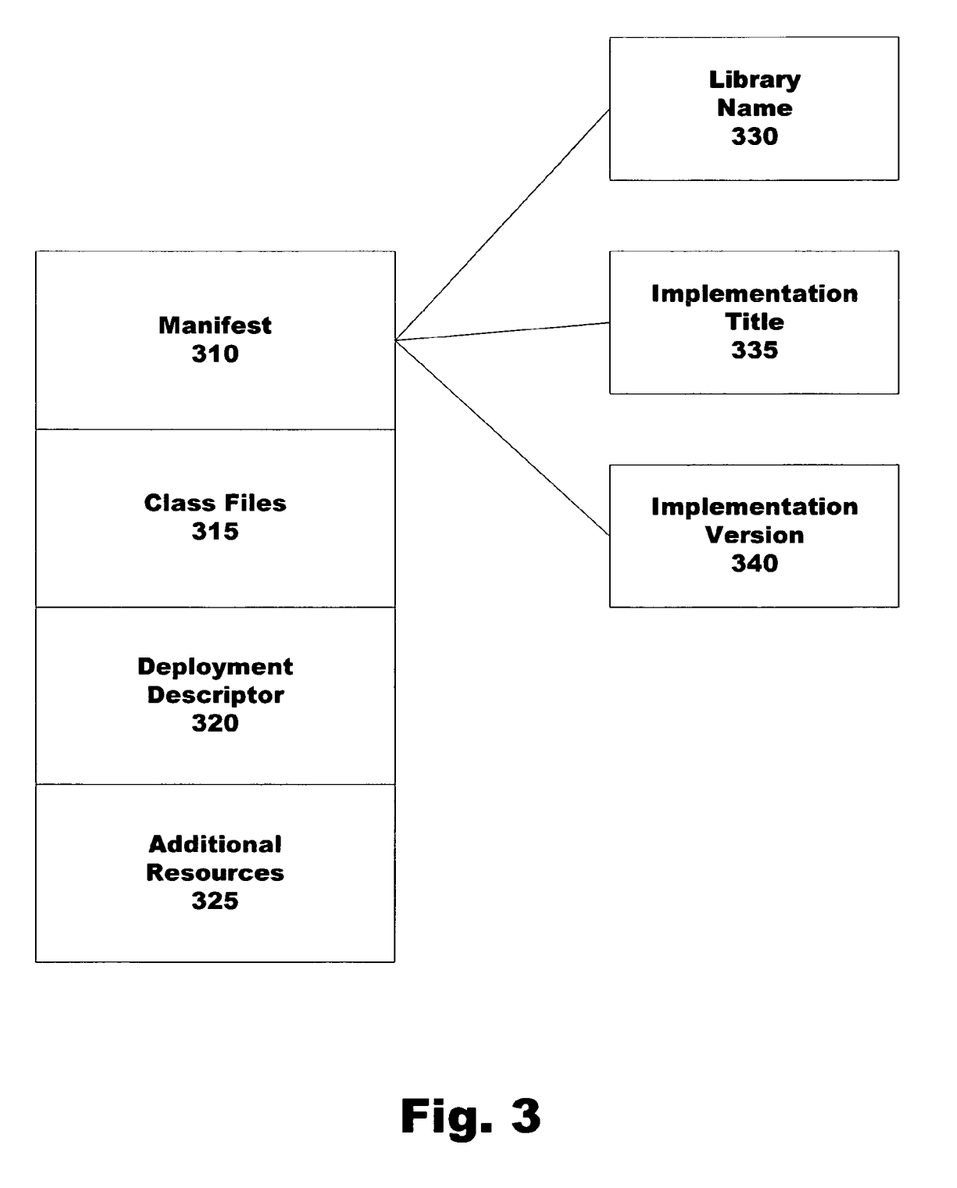
FIG. 3 illustrates the structure of a library module.

FIG. 3 illustrates the structure of a library module. The library module includes a manifest 310, class files 315, a deployment descriptor 320, and additional resources 325. The manifest 310 stores information for uniquely identifying the module to the web server and includes the library name 330, implementation title 335, and implementation version 340. In some embodiments, the manifest 310 also includes a specification version indicating a minimum extension specification version that is needed for extensions to the library module. In these embodiments, the key that is used for identifying a library module consists of name/specification version/implementation version.

The library name 330 is the unique identifier used to identify the module. The library name is used by the deployment tool 125 to identify the module when referenced by the application.xml file in the application 120. The implementation title 335 is a string that uniquely identifies the title of the library implementation. The implementation version 340 indicates a version of the implementation of the library module that is stored on the server storage. The web server preferably compares the implementation version 340 and library name 330 of the stored library module to the name and implementation version in the application.xml file of the associated application. In one embodiment, if the library name and implementation version do not match, the deployment tool 125 will not extract the library module.

The library module also includes class files 315. The class files are classes which contain the functionality of the module. The library module also includes additional resources 325. The additional resources include static content files for use by the library module 315. The library module additionally includes a deployment descriptor 320. The deployment descriptor preferably includes information necessary for representing the library module in different GUI tools, elements indicating each module used in the library module and its type and path in the JAR file storing the library module. Alternately, the library module can include a standard web-application deployment descriptor.

Figure 4:
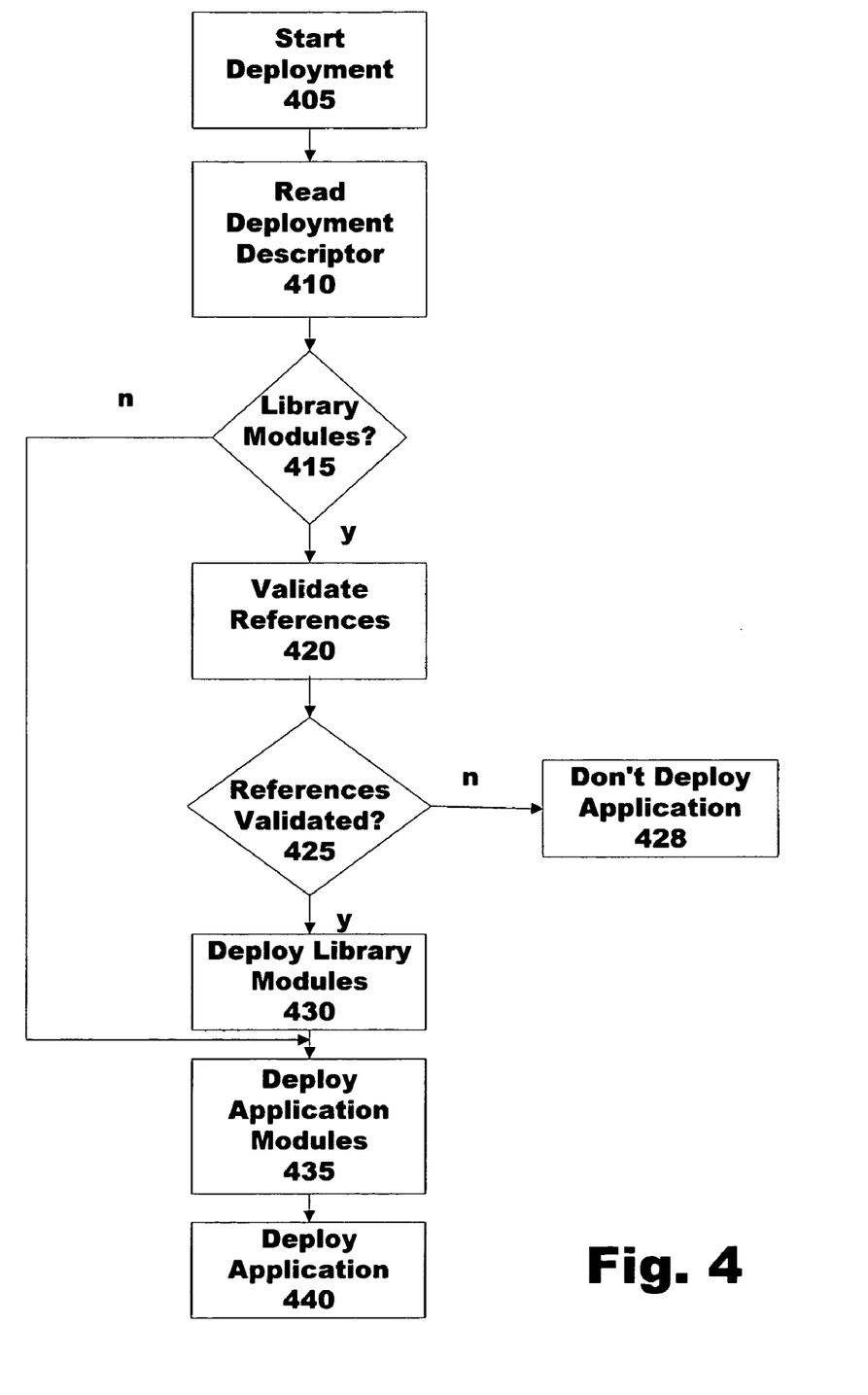
FIG. 4 is a flow chart illustrating a process for deploying a federated application.

FIG. 4 is a flow chart illustrating a process for deploying a federated application. The process begins with the deployment tool starting, in step 405, deployment of the applications 110 115, 120. In one embodiment, a certain number of preselected applications are deployed automatically. In an alternate embodiment, an administrator using a control console can manually select the applications that he wishes to deploy. The deployment tool selects an application for deployment and reads, in step 410, the deployment descriptor for the application. The deployment tool determines, in step 415, whether the deployment descriptor lists any references to library modules. For those deployment descriptors that are constructed as application.xml files, this comprises checking the beginning of the application.xml file for library module references. If there are no library modules listed, the process moves to step 435, which is described below.

If there are library modules referenced in the deployment descriptor, the server then, in step 420, validates the references stored in the deployment descriptor and verifies that they are registered with the server. When the server is first booted (previous to step 405), it performs a registration process where it reads an entry in the config.xml file indicating the location and implementation version of any library modules. Returning to step 420, the server reads the library module name listed in the deployment descriptor for the application and loads the library module located at the location associated with the module name in the server's config.xml file. The server also checks the implementation version of the module registered with the server to make sure that it matches the implementation version listed in the referencing deployment descriptor. If no module is stored at the location listed in the config.xml file, if the module located at the location described in the config.xml file does not have the same name in its manifest as the module listed in the application.xml file, or if the implementation version listed in the config.xml file or module manifest does not match the implementation version stored in the config.xml file, the server determines, in step 425, that the library module has not been validated and halts, in step 428, deployment of the application.

If the references are validated, the server then sequentially extracts and deploys, in step 430, each library module from the JAR file in which it is stored in the order that the library modules appear in the application.xml file. If any JAR files store multiple library modules, all of the library modules in the JAR file are deployed.

The server then deploys, in step 435, the modules listed in the application's application.xml file and then completes, in step 440, deployment of the application.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed is:

1. A method for deploying a plurality of applications, the method comprising:
providing at least one library module in a server storage, wherein the at least one library module performs commonly used functions shared by the plurality of applications and the at least one library module includes a manifest that stores information uniquely identifying the library module to a web server, and wherein the library module can be implemented in different implementation versions, and wherein the manifest includes an implementation version that indicates a version of an implementation of the library module stored in the server storage;

identifying the at least one library module using a key that includes a name of the at least one library module, an implementation version, and a specification version, wherein the specification version indicates a minimum extension specification version that is needed for extensions to the at least one library module;

providing a plurality of deployment descriptors, wherein each said deployment descriptor is associated with one of the plurality of applications stored in the server storage, wherein each said deployment descriptor includes a reference to the at least one library module, wherein the reference includes a minimum implementation version of the at least one library module required by a said application that is associated with the said deployment descriptor;

comparing the minimum implementation version in a first deployment descriptor of the plurality of deployment descriptors with the implementation version in the at least one library module, wherein the first deployment descriptor is associated with a first application of the plurality of applications in the server storage;

deploying the first application to a first web server, if the implementation version in the at least one library module satisfies the minimum implementation version in the first deployment descriptor, and generating a first deployed application based on the at least one library module and the first application, such that the first application has access to the commonly used functions provided by the at least one library module;

comparing the minimum implementation version in a second deployment descriptor of the plurality of deployment descriptors with the implementation version in the at least one library module, wherein the second deployment descriptor is associated with a second application of the plurality of applications in the server storage; and deploying the second application to a second web server, if the implementation version in the at least one library module satisfies the minimum implementation version in the second deployment descriptor, and generating a second deployed application based on the at least one library module and the second application, such that the second application has access to the commonly used functions provided by the at least one library module.

2. The method of claim 1, wherein each said deployment descriptor is in a markup language.

3. The method of claim 1, wherein the at least one library module is stored in an archive file.

4. The method of claim 1, wherein the at least one library module is stored externally to the plurality of applications.

5. The method of claim 1, further comprising:
halting a deployment of the first application when the implementation version in the at least one library module does not satisfy the minimum implementation version required by the first application.

6. The method of claim 1, further comprising:
halting a deployment of the second application when the implementation version in the at least one library module does not satisfy the minimum implementation version required by the second application.

7. The method of claim 1, further comprising:
allowing the minimum implementation version in the first said deployment descriptor to be different from the minimum implementation version in the second deployment descriptor.

8. A computer program product, stored on a computer readable storage medium, and including computer executable instructions for deploying a plurality of applications, the instructions comprising instructions for:

providing at least one library module in a server storage, wherein the at least one library module performs commonly used functions shared by the plurality of applications and the at least one library module includes a manifest that stores information uniquely identifying the library module to a web server, and wherein the library module can be implemented in different implementation versions, and wherein the manifest includes an implementation version that indicates a version of a implementation of the library module stored in the server storage;

identifying the at least one library module using a key that includes a name of the at least one library module, an implementation version, and a specification version, wherein the specification version indicates a minimum extension specification version that is needed for extensions to the at least one library module;

providing a plurality of deployment descriptors, wherein each said deployment descriptor is associated with one of the plurality of applications stored in the server storage, wherein each said deployment descriptor includes a reference to the at least one library module, wherein the reference includes a minimum implementation version of the at least one library module required by a said application that is associated with the said deployment descriptor;

comparing the minimum implementation version in a first deployment descriptor of the plurality of deployment descriptors with the implementation version in the at least one library module, wherein the first deployment descriptor is associated with a first application of the plurality of applications in the server storage;

deploying the first application to a first web server, if the implementation version in the at least one library module satisfies the minimum implementation version in the first deployment descriptor, and generating a first deployed application based on the at least one library module and the first application, such that the first application has access to the commonly used functions provided by the at least one library module;

comparing the minimum implementation version in a second deployment descriptor of the plurality of deployment descriptors with the implementation version in the at least one library module, wherein the second deployment descriptor is associated with a second application of the plurality of applications in the server storage; and deploying the second application to a second web server, if the implementation version in the at least one library module satisfies the minimum implementation version in the second deployment descriptor, and generating a second deployed application based on the at least one library module and the second application, such that the second application has access to the commonly used functions provided by the at least one library module.

9. The computer program product of claim 8, wherein the deployment descriptor is in a markup language.

10. The computer program product of claim 8, wherein the at least one library module is stored in an archive file.

11. The computer program product of claim 8, wherein the at least one library module is stored externally to the plurality of applications.

12. A system for deploying a plurality of applications, the system comprising:

at least one library module in a server storage, wherein the at least one library module performs commonly used functions shared by the plurality of applications and the at least one library module includes a manifest that stores information uniquely identifying the library module to a web server, and wherein the library module can be implemented in different implementation versions, and wherein the manifest includes an implementation version that indicates a version of a implementation of the library module stored in the server storage;

a plurality of deployment descriptors, wherein each said deployment descriptor is associated with one of the plurality of applications stored in the server storage, wherein each said deployment descriptor includes a reference to the at least one library module, wherein the reference includes a minimum implementation version of the at least one library module required by a said application that is associated with the said deployment descriptor; and a deployment tool, running on one or more processors, configured to:

compare the minimum implementation version in a first deployment descriptor of the plurality of deployment descriptors with the implementation version in the at least one library module, wherein the first deployment descriptor is associated with a first application of the plurality of applications in the server storage;

deploy the first application to a first web server, if the implementation version in the at least one library module satisfies the minimum implementation version in the first deployment descriptor, and generate a first deployed application based on the at least one library module and the first application, such that the first application has access to the commonly used functions provided by the at least one library module;

identify the at least one library module using a key that includes a name of the at least one library module, an implementation version, and a specification version, wherein the specification version indicates a minimum extension specification version that is needed for extensions to the at least one library module;

compare the minimum implementation version in a second deployment descriptor of the plurality of deployment descriptors with the implementation version in the at least one library module, wherein the second deployment descriptor is associated with a second application of the plurality of applications in the server storage; and deploy the second application to a second web server, if the implementation version in the at least one library module satisfies the minimum implementation version in the second deployment descriptor, and generate a second deployed application based on the at least one library module and the second application, such that the second application has access to the commonly used functions provided by the at least one library module.

13. The system of claim 12, wherein the deployment descriptor is in a markup language.

14. The system of claim 12, wherein the at least one library module is stored in an archive file.

15. The system of claim 12, wherein the at least one library module is stored externally to the plurality of applications.

\* \* \* \* \*